United States Patent

Hall et al.

[11] Patent Number: 5,811,999
[45] Date of Patent: Sep. 22, 1998

[54] POWER CONVERTER HAVING SWITCHING FREQUENCY PHASE LOCKED TO SYSTEM CLOCK

[75] Inventors: George Arthur Hall, San Jose; Richard Allen Smith, Milpitas, both of Calif.

[73] Assignee: Micro Linear Corporation, San Jose, Calif.

[21] Appl. No.: 764,593

[22] Filed: Dec. 11, 1996

[51] Int. Cl.[6] .................................................. H03L 7/06
[52] U.S. Cl. .......................... 327/156; 327/158; 327/243; 327/244
[58] Field of Search ................................ 327/156, 158, 327/243, 244

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |

(List continued on next page.)

OTHER PUBLICATIONS

"Nonlinear-Carrier Control for High Power Factor Rectifiers Based On Flyback, Cuk, or Sepic Converters," R. Zane and D. Maksimovic, Applied Power Electronics Conf., pp. 814–820, 1996.

"Nonlinear-Carrier Control for High Power Factor Boost Rectifiers," D. Maksimovic, Y. Jang, R. Erikson, Applied Power Electronics Conf., pp. 635–641, 1995.

(List continued on next page.)

Primary Examiner—Margaret Rose Wambach
Attorney, Agent, or Firm—Haverstock & Owens LLP

[57] ABSTRACT

A circuit for synchronizing a periodic ramp signal utilized in a switching mode power converter to system clock signal. A capacitor is charged through a resistor. When a voltage across the capacitor reaches a predetermined level, the capacitor is discharged and the charging cycle is repeated, thereby generating the periodic ramp signal across the capacitor. A waveform shaping circuit shapes the ramp signal into a rectangular wave signal having a same frequency and phase as the ramp signal. A phase comparator compares a phase of the rectangular wave signal to a phase of the system clock signal for forming a phase error signal. The phase error signal controls a level of current supplied to the timing capacitor by a voltage controlled current source. When the frequency of the system clock signal is higher than the frequency of the ramp signal, the phase comparator causes the voltage controlled current source to supply additional current to the capacitor, increasing the frequency of the ramp signal. When the frequency of the system clock signal is lower than the frequency of the ramp signal, the phase comparator causes the voltage controlled current to supply less current to the capacitor, decreasing the frequency of the ramp signal. Therefore, the frequency of the ramp signal is controlled in phase locked loop to synchronize the ramp signal with the system clock signal. The synchronized ramp signal can then be utilized for controlling switching in the switching mode power converter, reducing the effects of switching noise.

25 Claims, 14 Drawing Sheets

U.S. PATENT DOCUMENTS

| | | | |
|---|---|---|---|
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 258/342 |
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,920,309 | 4/1990 | Szepesi | 323/269 |
| 4,929,882 | 5/1990 | Szepesi | 323/222 |
| 4,941,080 | 7/1990 | Sieborger | 363/127 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,146,399 | 9/1992 | Gucyski | 363/89 |
| 5,223,931 | 6/1993 | Fernsler et al. | 348/540 |
| 5,278,490 | 1/1994 | Smedley | 323/284 |
| 5,359,281 | 10/1994 | Barrow et al. | 323/222 |
| 5,412,308 | 5/1995 | Brown | 323/267 |
| 5,434,767 | 7/1995 | Batarseh et al. | 363/16 |
| 5,440,473 | 8/1995 | Ishii et al. | 363/21 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,565,761 | 10/1996 | Hwang | 323/222 |
| 5,568,041 | 10/1996 | Hesterman | 323/207 |
| 5,592,128 | 1/1997 | Hwang | 331/61 |
| 5,619,276 | 4/1997 | Christopher et al. | 348/541 |

OTHER PUBLICATIONS

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current–Mode Pulse–Frequency Modulation", Urs Mader and K. Kit Sum, Micro Linear Corporation, Apr. 17, 1994.

"Step–Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993.

"11. Variable Frequency Converters", K. Kit Sum, pp. 96–97, 134–135, 1993.

"3.3V/5V/Adjustable Output, Step–Up, DC–DC Converters", Maxim Integrated Products, pp. 1–8, 1993.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controlled Converter", Richard Redl, pp. 897–906, IEEE, 1991.

"Low–Voltage–Input, 3V/3.3V/5V/Adjustable–Output, Step–Up DC–DC Converters", Maxim Integrated Products, pp. 4–189 to 4–191 (no date).

"LT1073 Micropower DC–DC Converter Adjustable and Fixed 5V, 12V", Linear Technology, pp. 4–174 to 4–189, 4–192, (no date).

"ML4823 High Frequency Power Supply Controller," Micro Linear Corporation, Dec. 1994.

"ML4863 High Efficiency Battery Pack Converter (Preliminary)", Micro Linear Corporation, Jun. 1994.

"ML 4880 Portable PC/PCMCIA Power Controller (Preliminary)", Mirco Linear Corporation, Oct. 1995.

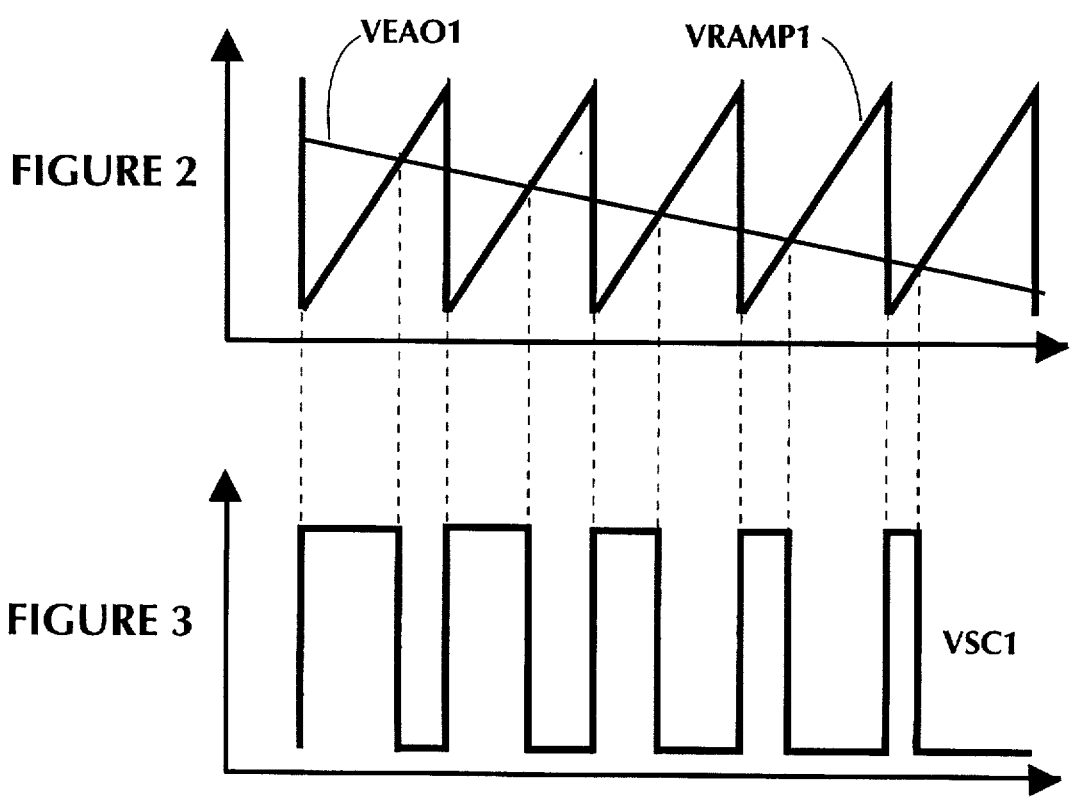

POWER CONVERTER HAVING SWITCHING FREQUENCY PHASE LOCKED TO SYSTEM CLOCK

FIELD OF THE INVENTION

The invention relates to switching mode power converters. More, particularly the invention relates to switching mode power converters wherein the switching frequency is phase locked to a system clock for reducing the effects of switching noise on the system.

BACKGROUND OF THE INVENTION

Switching mode power converters are commonly utilized for providing a regulated supply to electronic circuits. In a typical switching mode power converter, the output voltage is regulated by monitoring a level of the output voltage, comparing that monitored level to a predetermined desired level and developing a response to that comparison to minimize a difference between the monitored level and the predetermined desired level. FIG. 1 illustrates a prior art switching mode power converter circuit for providing a regulated output voltage. Referring to FIG. 1, a supply voltage node Vs is coupled to a first terminal of a switch S1. A second terminal of the switch S1 is coupled to a first terminal of a switch S2 and to a first terminal of an inductor L. A second terminal of the inductor L is coupled to a first terminal of a capacitor C1, forming an output node Vo, and to a first terminal of a resistor R1. A second terminal of the switch S2 and a second terminal of the capacitor C1 are coupled to a ground node. A load RL can be coupled across the capacitor C1.

A second terminal of the resistor R1 is coupled to a first terminal of a resistor R2 and to an inverting input of an amplifier U1. A second terminal of the resistor R2 is coupled to the ground node. A reference voltage VREF1 is coupled to a non-inverting input of the amplifier U1. An output of the amplifier U1 forms an error signal VEAO1 which is coupled to a non-inverting input of a comparator U2. A oscillator U3 generates a periodic ramp signal VRAMP1 having a fixed frequency which is coupled to an inverting input of the comparator U2. An output of the comparator U2 forms a signal VSC1 which is coupled to control the switch S1. The signal VSC1 is inverted by an inverter U4 for controlling the switch S2.

FIG. 2 illustrates a timing diagram of the signal VRAMP1 and the signal VEAO1 for the circuit illustrated in FIG. 1. FIG. 3 illustrates a timing diagram of the signal VSC1 for the circuit illustrated in FIG. 1. Referring to FIGS. 1–3, when the signal VSC1 is logical high voltage, the switch S1 is closed and the switch S2 is open. When the switches S1 and S2 are in this condition, a current from the supply node Vs charges the inductor L with energy. When the signal VSC1 is a logical low voltage, the switch S1 is open and the switch S2 is closed. When the switches S1 and S2 are in this condition, energy stored in the inductor L is transferred to the capacitor C1. By alternately closing and opening the switches S1 and S2 in this manner, an output voltage can be formed across the capacitor C1 which can be applied to the load RL. The amount of energy stored in the inductor L and transferred to the capacitor C1 can be controlled by adjusting the time period during which the switch S1 is closed.

A resistive divider comprising the resistors R1 and R2 forms a voltage that is a portion of the output voltage across the capacitor C1. A difference between the reference voltage VREF1 and the voltage formed by the resistive divider is amplified by the amplifier U1, forming the error signal VEAO1. The error signal VEAO1 is compared to the ramp signal VRAMP1 by the comparator U2, forming the signal VSC1. The point where the signal VEAO1 intersects each sloping portion of the ramp signal VRAMP1 determines the duty cycle for the switches S1 and S2 and, hence, the output voltage. Accordingly, if the voltage across the capacitor C1 increases, the signal VEAO1 decreases. This reduces the duty cycle of the signal S1 such that the amount of energy transferred to the capacitor C1 is reduced, thereby reducing the voltage across the capacitor C1. If the voltage across the capacitor C1 decreases, the signal VEAO1 increases. This increases the duty cycle of the signal S1 such that the amount of energy transferred to the capacitor C1 is increased, thereby increasing the voltage across the capacitor C1. Therefore, the output voltage at the node Vo is regulated in a feedback loop to remain at a constant level.

The power converter illustrated in FIG. 1 has a drawback in that the output voltage can include switching noise caused by opening and closing the switches S1 and S2. Many electronic circuits, especially those utilized in computing and telecommunication systems, are sensitive to switching noise generated by such switching mode power converters. Often, the switching noise disturbs sensitive circuits because it is asynchronous to the system clock frequency. For example, certain operations involving digital-to-analog or analog-to-digital converters may be performed during each period of the system clock. If the switching frequency of the power converter is asynchronous to the system clock frequency, noise introduced by the switching mode power converter can vary over each digital-to-analog or analog-to-digital conversion. These variations can cause undesirable errors in the conversion. In particular, when converting a digital signal to an audio signal, the result can be a noticeable hum superimposed upon the reconstructed audio signal.

A prior art technique for reducing the effects of switching noise is to condition the output of the switching mode converter with a passive filter or with a linear regulator. Each stage of a passive filter generally requires a discrete inductor and capacitor. These components, however, tend to be costly and tend to occupy a relatively large amount of space on a printed circuit board. Linear regulators are also costly and consume valuable board space. Further, linear regulators tend to increase the complexity of the system thereby increasing the likelihood that a failure can occur.

A prior art circuit for synchronizing the switching frequency of a switching mode power converter with a system clock is illustrated in FIG. 4. Referring to FIG. 4, a SYNC1 signal generated from a system clock signal is applied to a first terminal of a resistor R3. A second terminal of the resistor R3 is coupled to a first terminal of a capacitor C2. A second terminal of the capacitor C2 is coupled to a first terminal of a capacitor C3 and to a first terminal of a resistor R4. A second terminal of the capacitor C3 is coupled to a non-inverting input of an hysteretic comparator U5, to a first terminal of a resistor R5 and to a collector of an npn bipolar transistor Q1, forming a node VRAMP2. An inverting input of the hysteretic comparator U5 is coupled to a reference voltage VREF2.

A second terminal of the resistor R5 is coupled to a reference voltage VREF3 and to a collector of an npn bipolar transistor Q2. A base of the transistor Q2 is coupled to an output of the hysteretic comparator U5 and to a first terminal of a resistor R6. A second terminal of the resistor R6 is coupled to a base of the transistor Q1. An emitter of the transistor Q2 is coupled to a first terminal of a resistor R7. A second terminal of the resistor R7, an emitter of the transistor Q1 and a second terminal of the resistor R4 are coupled to the ground node.

In the absence of a SYNC1 signal, the circuit illustrated in FIG. 4 generates a periodic ramp signal, similar to the signal VRAMP1 illustrated in FIG. 2, having a free-running frequency dependent upon the values of the resistor R5 and the capacitor C3 and upon the levels of VREF2 and VREF3. The capacitor C3 is charged through the resistor R5 from the voltage VREF3. When the voltage across the capacitor C3 reaches the trip point of the hysteretic comparator U5 set by the voltage VREF2, the output of the hysteretic comparator causes the transistor Q1 to discharge the capacitor C3. A rectangular wave signal having the same frequency as the ramp signal VRAMP2 is generated at the emitter of the transistor Q2.

FIG. 5 illustrates a timing diagram of the SYNC1 signal that can be applied to the circuit illustrated in FIG. 4. FIG. 6 illustrates a timing diagram of a signal VRAMP2 generated at the node VRAMP2 when the SYNC1 signal illustrated in FIG. 5 is applied to the circuit illustrated in FIG. 4.

For the ramp signal VRAMP2 to be synchronized with the SYNC1 signal, the SYNC1 signal must have a sufficient amplitude and the free-running frequency must be 85 to 95 percent of the frequency of the SYNC1 signal. Therefore, this approach has a drawback in that the ramp signal can be synchronized with only a relatively narrow range of system clock frequencies.

Therefore, what is needed is a technique for reducing the effects of switching noise in a switching mode power converter that does not suffer from the drawbacks associated with these prior art circuits.

SUMMARY OF THE INVENTION

The invention is a circuit for synchronizing a periodic ramp signal utilized for controlling switching in a switching mode power converter to system clock signal. A timing capacitor is charged through a timing resistor. When a voltage across the capacitor reaches a predetermined level, the capacitor is discharged and the charging cycle is repeated, thereby generating the periodic ramp signal across the capacitor. The periodic ramp signal is processed by a waveform shaping circuit for forming a rectangular wave signal having a same frequency and phase as the periodic ramp signal. A phase comparator compares the phase of the rectangular wave signal to a phase of the system clock signal for forming a phase error signal. The phase error signal controls a level of current supplied to the timing capacitor by a voltage controlled current source.

When the frequency of the system clock signal is higher than the frequency of the ramp signal, the phase comparator causes the voltage controlled current source to supply additional current to the timing capacitor. This charges the capacitor faster, increasing the frequency of the ramp signal. When the frequency of the system clock signal is lower than the frequency of the ramp signal, the phase comparator causes the voltage controlled current to supply less current to the timing capacitor. This charges the capacitor slower, decreasing the frequency of the ramp signal. Therefore, the frequency of the ramp signal is controlled in phase locked loop to synchronize the ramp signal with the system clock signal. The ramp signal can be synchronized with a wide range of system clock frequencies.

The synchronized ramp signal can then be utilized for controlling switching in the switching mode power converter. The effects of switching noise are reduced because the switching noise is synchronized with the system clock signal.

BRIEF DESCRIPTION OF THE DRAWINGS

FIG. 2 illustrates a timing diagram of the signal VRAMP1 and the signal VEAO1 for the circuit illustrated in FIG. 1.

FIG. 3 illustrates a timing diagram of the signal VSC1 for the circuit illustrated in FIG. 1.

DESCRIPTION OF THE PREFERRED EMBODIMENTS

Figure 1:
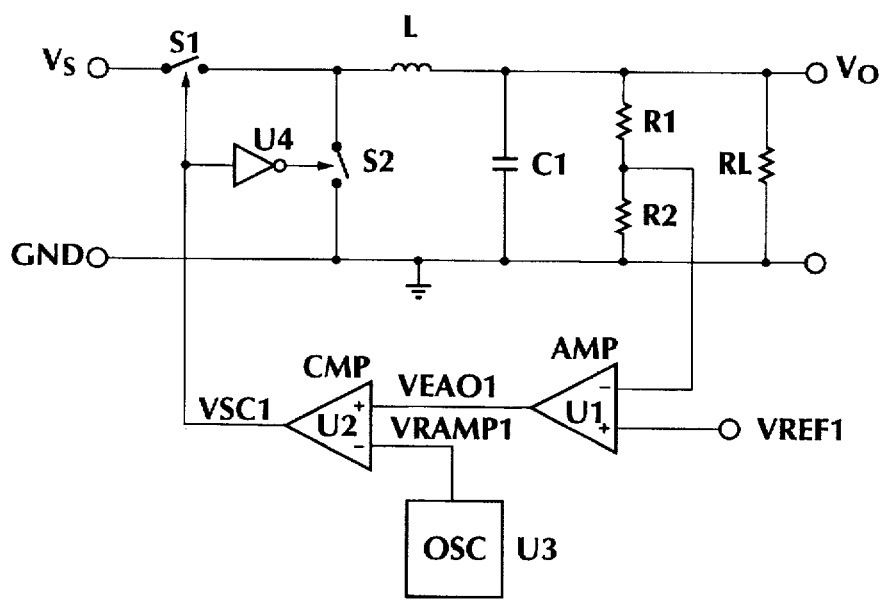
FIG. 1 illustrates a prior art switching mode power converter circuit for providing a regulated output voltage.
Figure 4:
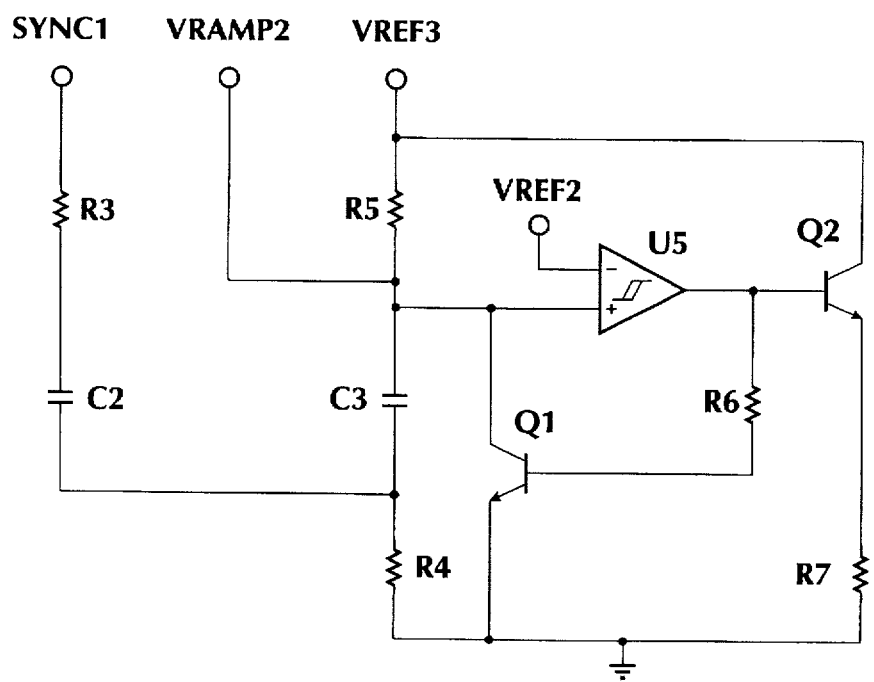
FIG. 4 illustrates a prior art circuit for synchronizing the switching frequency of the circuit illustrated in FIG. 1 with a system clock.
Figure 5:
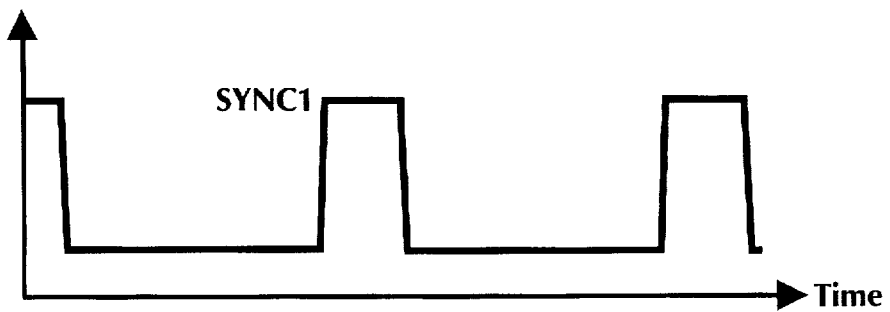
FIG. 5 illustrates a timing diagram of the SYNC1 signal that can be applied to the circuit illustrated in FIG. 4.
Figure 6:
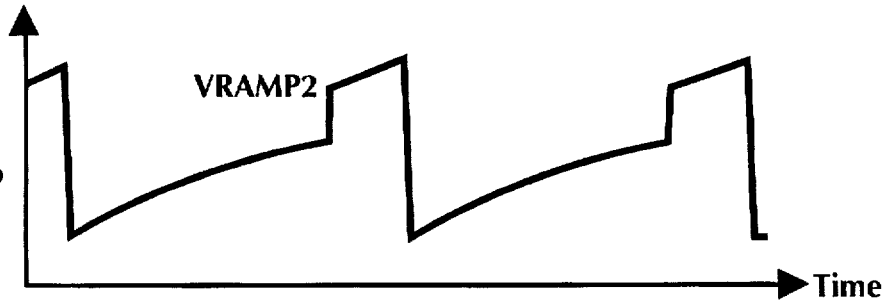
FIG. 6 illustrates a timing diagram of a signal generated at the node VRAMP2 when the SYNC1 signal illustrated in FIG. 5 is applied to the circuit illustrated in FIG. 4.
Figure 7:
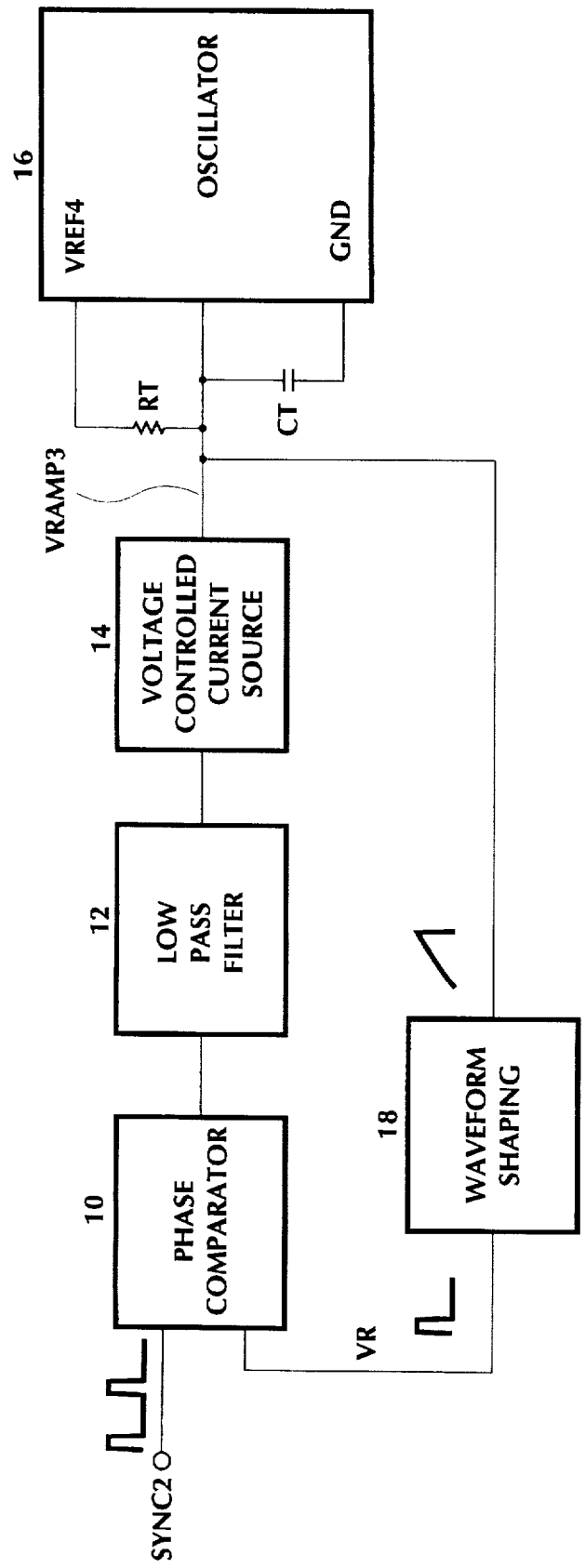
FIG. 7 illustrates a block schematic diagram of a circuit for synchronizing the switching frequency of a power converter with a system clock according to the present invention.

FIG. 7 illustrates a block schematic diagram of a circuit for synchronizing the switching frequency of a switching mode power converter with a system clock according to the present invention. A synchronizing signal SYNC2 is applied to a first input of a phase comparator 10. An output of the phase comparator 10 is coupled to an input of a low pass filter 12. An output of the low pass filter 12 is coupled to an input of a voltage-controlled current source 14. An output of the voltage controlled current source 14 is coupled to a first terminal of a timing resistor $R_T$, to a first terminal of a timing capacitor $C_T$, to a first terminal of an oscillator 16 for a switching mode power converter and to an input of a waveform shaping circuit 18. A second terminal of the timing resistor $R_T$ is coupled to a second terminal VREF4 of the oscillator 16 and a second terminal of the timing capacitor $C_T$ is coupled to a third terminal GND of the oscillator 16. An output of the waveform shaping circuit 18 is coupled to a second input of the phase comparator 10.

Figure 8:
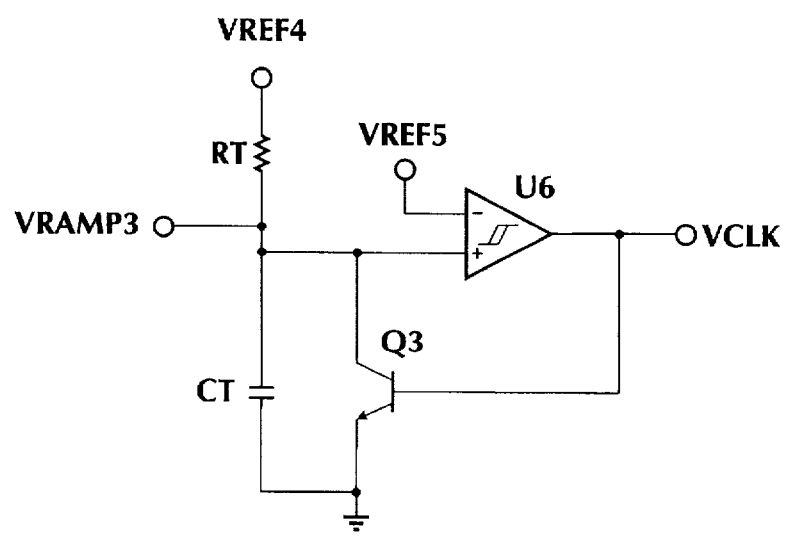
FIG. 8 illustrates a schematic diagram of an embodiment of the oscillator 16 illustrated in FIG. 7.

FIG. 8 illustrates a schematic diagram of an embodiment of the oscillator 16 illustrated in FIG. 7. A reference voltage node VREF4 is coupled to a first terminal of the resistor $R_T$. A second terminal of the resistor $R_T$ is coupled to a first terminal of a capacitor $C_T$, to a collector of an npn bipolar transistor Q3 and to a non-inverting input of an hysteretic comparator U6, forming a node VRAMP3. A second terminal of the capacitor $C_T$ and an emitter of the transistor Q3 are coupled to the ground node. A base of the transistor Q3 is coupled to an output of the comparator U6, forming a node VCLK. A reference voltage level VREF5 is coupled to an inverting input of the comparator U6.

The level of voltage at the node VREF6 is higher than the ground level and represents a maximum amplitude for the signal formed at the node VRAMP3. When the output of the comparator U6 is a logical high voltage, the transistor Q3 is turned on, bringing the voltage level at the node VRAMP3 to near the ground level. This causes the output of the comparator U6 to fall to a logical low voltage. Because the comparator U6 is hysteretic, its output does not fall until the capacitor $C_T$ has discharged to a level below its fully charged level. Then, the capacitor $C_T$ begins charging with a current from the node VREF4, causing the voltage at the node VRAMP3 to rise such that it has a positive slope that is substantially linear. When the voltage at the node VRAMP3 rises above the reference voltage VREF5, the output of the comparator U6 rises to a logical high voltage, turning the transistor Q3 on again, and the cycle repeats. The signal at the node VCLK can be utilized as a clock signal for other circuits of the switching mode power converter.

The voltage controlled current source 14 can be coupled to the node VRAMP3 illustrated in FIG. 8 and affects the frequency of the ramp signal VRAMP3 by supplying a current for controlling the rate at which the timing capacitor $C_T$ is charged. Therefore, the voltage controlled current source 14 and oscillator 16 together form a voltage controlled oscillator (VCO) wherein the output frequency is related to the level of voltage applied to the voltage controlled current source 14.

Figure 9:
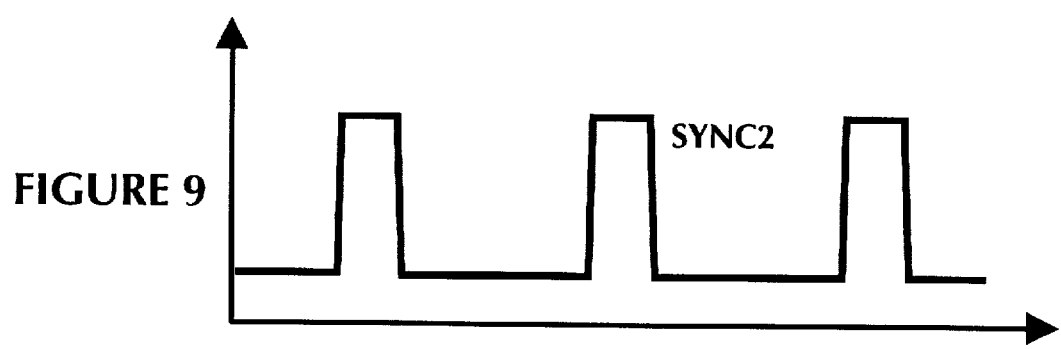
FIG. 9 illustrates a timing diagram of the SYNC2 signal for the circuit illustrated in FIG. 7.
Figure 10:
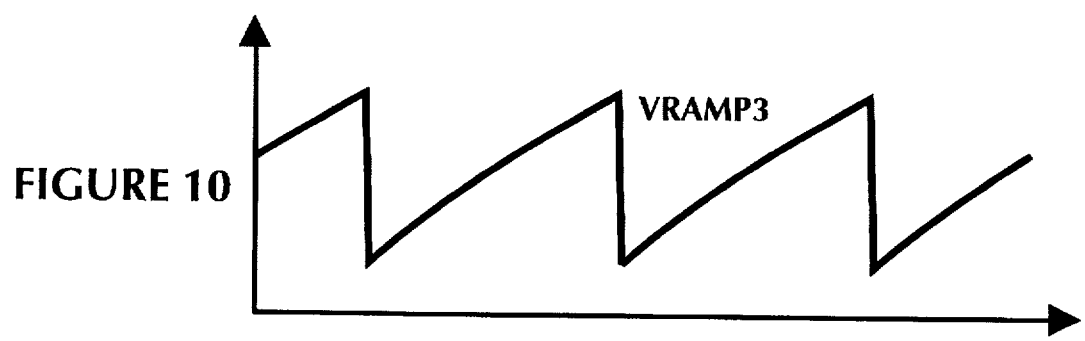
FIG. 10 illustrates a timing diagram of the VRAMP3 signal generated by the circuit illustrated in FIG. 7.

FIG. 9 illustrates a timing diagram of the synchronizing signal SYNC2, such as a system clock signal, for the circuit illustrated in FIG. 7. FIG. 10 illustrates a timing diagram of the ramp signal VRAMP3 generated by the circuit illustrated in FIGS. 7–8. The ramp signal VRAMP3 is synchronized to the signal SYNC2 and can be utilized to control the duty cycle of a power switch in a switching mode power converter and, hence, the output voltage. For example, this can be achieved by comparing the signal VRAMP3 to a signal representative of an output voltage of the power converter. The effects of switching noise are reduced because switching is synchronized with the system clock signal.

The waveform shaping circuit 18 forms a rectangular wave signal having the same frequency and phase as the ramp signal VRAMP3. The waveform shaping circuit 18 modifies the ramp signal VRAMP3 to be in a form that is acceptable for phase comparison by the phase comparator 10. Preferably, the waveform shaping circuit 18 generates a rectangular signal having a low duty cycle wherein each rising edge of the rectangular signal VR coincides with a falling edge of the ramp signal VRAMP3. The frequency of the ramp signal VRAMP3 is compared to the frequency of a synchronizing signal SYNC2, such as a system clock signal, by the phase comparator 10. If the frequency of the SYNC2 signal is greater than the frequency of the VRAMP3 signal, the voltage controlled current source 14 supplies a current to charge the timing capacitor $C_T$ faster. By charging the timing capacitor $C_T$ faster, the frequency of the ramp signal VRAMP3 is increased. If the frequency of the SYNC2 signal is lower than the frequency of the ramp signal VRAMP3, the voltage controlled current source 14 supplies less current. This charges the capacitor $C_T$ at a slower rate. By charging the capacitor $C_T$ at a slower rate, the frequency of the ramp signal VRAMP3 is decreased. Accordingly, the circuit illustrated in FIG. 7 forms a phase locked loop having negative feedback for matching the frequency of the ramp signal VRAMP3 to the frequency of the SYNC2 signal. Preferably, the falling edge of the ramp signal VRAMP3 is locked to the rising edge of the SYNC2 signal, as shown in FIGS. 9–10.

The low pass filter 12 serves to smooth the output of the phase comparator 10 such that it is relatively free from ripple. This helps ensure that the ramp signal VRAMP3 will be substantially free from phase jitter. Therefore, a feedback loop which utilizes the ramp signal VRAMP3 to control the duty cycle of a switch in a power converter remains stable despite operation of the phase locked loop for controlling the frequency of the ramp signal VRAMP3.

Figure 11:
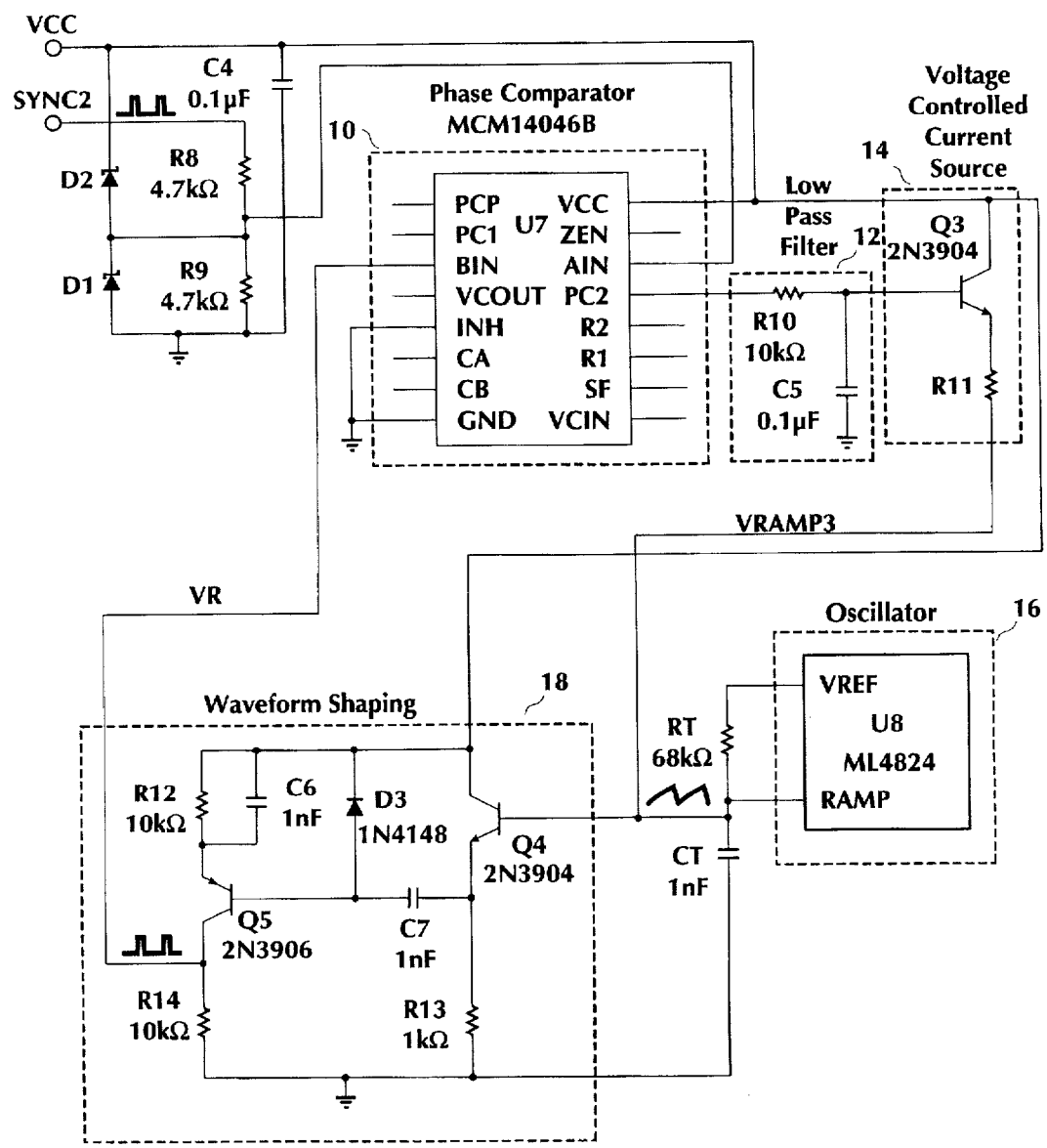
FIG. 11 illustrates a schematic diagram of a circuit for synchronizing switching of a switching mode power converter with a system clock according to the present invention.

FIG. 11 illustrates a schematic diagram of a circuit for synchronizing switching of a switching mode power converter with a system clock according to the present invention. Elements illustrated in FIG. 11 having a one-to-one functional correspondence with block elements illustrated in FIG. 7 are enclosed by dotted lines and given the same reference characters as the corresponding block element illustrated in FIG. 7. The synchronizing signal SYNC2 is applied to a node coupled to a first terminal of a resistor R8. A second terminal of the resistor R8 is coupled to first terminal of a resistor R9, to a cathode of a Schottky diode D1, to an anode of a schottky diode D2 and to an imput terminal $A_{IN}$ of a phase comparator U7. A ground terminal GND and an INH terminal of the phase comparator U7 are coupled to the ground node. The phase comparator circuit U7 is preferably an integrated circuit manufactured by Motorola under part number MC14046B, or by RCA under part numbers CD54/74HC 4046A or CD54/74HCT 4046A, but can be any suitable phase comparator.

A second terminal of the resistor R9 and an anode of the diode D1 are coupled to the ground node. A cathode of the diode D2 is coupled to a supply voltage node Vcc, to a first terminal of a capacitor C4, to a supply terminal Vcc of the phase comparator U7 and to a collector of an npn bipolar transistor Q3. An output PC2 of the phase comparator 10 is coupled to a first terminal of a resistor R10. A second terminal of the resistor R10 is coupled to a first terminal of a capacitor C5 and to a base of the transistor Q3. A second terminal of the capacitor C5 is coupled to the ground node. An emitter of the transistor Q3 is coupled to a first terminal of a resistor R11. A second terminal of the resistor R11 is coupled to a first terminal of a timing resistor $R_T$, to a first terminal of a timing capacitor $C_T$, to a RAMP input terminal of an oscillator U8 and to a base of an npn bipolar transistor Q4. A second terminal of the timing capacitor $C_T$ is coupled to the ground node.

A collector of the transistor Q4 is coupled to the supply node Vcc, to a cathode of a diode D3, to a first terminal of a capacitor C6 and to a first terminal of a resistor R12. An anode of the diode D3 is coupled to a first terminal of a capacitor C7 and to a base of an pnp bipolar transistor Q5. An emitter of the transistor Q4 is coupled to first terminal of a resistor R13 and to a second terminal of the capacitor C7. A second terminal of the resistor R13 is coupled to the ground node. A second terminal of the capacitor C6 is coupled to a second terminal of the resistor R12 and to an emitter of a pnp bipolar transistor Q5. A collector of the transistor Q5 is coupled to a first terminal of a resistor R14 and to an input terminal $B_{IN}$ of the phase comparator U7. A second terminal of the resistor R14 is coupled to the ground node.

The circuit illustrated in FIG. 11 functions to synchronize the periodic ramp signal VRAMP3 to the SYNC2 signal, as described in reference to FIGS. 7–10. The phase comparator U7 compares the phase of the SYNC2 signal to a rectangular wave signal VR formed by the waveform shaping circuit 18. Because the rectangular wave signal VR has the same frequency as the VRAMP3 signal, the output of the phase comparator 10 is indicative of a difference in frequency of the SYNC2 signal and the VRAMP3 signal. When the frequency of the VRAMP3 signal is greater than the frequency of the SYNC2 signal, the output PC2 of the phase comparator 10 reduces a voltage applied to the base of the transistor Q3 which reduces a current supplied by the transistor Q3 to the capacitor $C_T$. Because the current supplied by the transistor Q3 is reduced, a longer time is required to charge the capacitor $C_T$. Because a longer time is required to charge the capacitor $C_T$, the frequency of the VRAMP3 signal is reduced.

Conversely, when the frequency of the VRAMP3 signal is lower than the frequency of the SYNC signal, the output PC2 of the phase comparator 10 increases the voltage applied to the base of the transistor Q3 which increases a current supplied by the transistor Q3 to the capacitor $C_T$. Because the current supplied by the transistor Q3 is increased, a shorter time is required to charge the capacitor $C_T$. Because a shorter time is required to charge the capacitor $C_T$, the frequency of the VRAMP3 signal is increased. Therefore, the circuit illustrated in FIG. 11 synchronizes the VRAMP3 signal to the SYNC2 signal in a phase locked loop with negative feedback.

Note that in FIG. 11, the resistors R8 and R9 and the diodes D1 and D2 can be omitted if the waveform of the SYNC signal meets the requirements of the phase comparator 10. In such case, the SYNC signal can be applied directly to the $A_{IN}$ terminal of the phase comparator 10.

Figure 12:
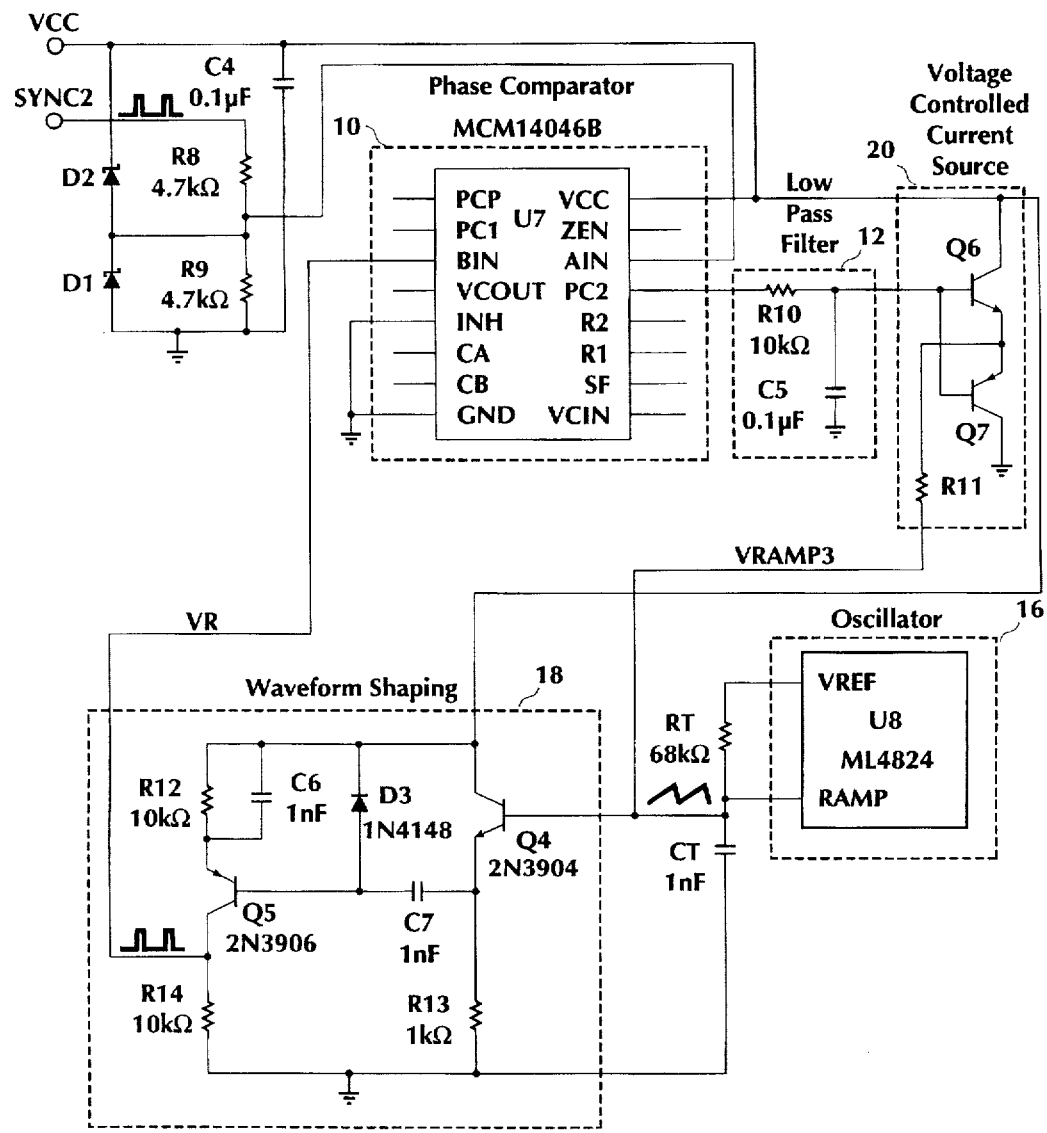
FIG. 12 illustrates a schematic diagram of a circuit for synchronizing a switching frequency of a power converter to a frequency lower than the free-running frequency of the power converter oscillator.

FIG. 12 illustrates a schematic diagram of a circuit for synchronizing a switching frequency of a power converter to a frequency lower than the free-running frequency of the power converter oscillator. The circuit illustrated in FIG. 12 differs from the circuit illustrated in FIG. 11 in that the voltage controlled current source 14 illustrated in FIG. 12 having a single transistor Q3 has been replaced with a voltage controlled current source 20 having two transistors Q6 and Q7. Circuit elements illustrated in FIG. 12 having a one-to-one functional correspondence to elements illustrated in FIG. 11 are given the same reference numerals. A base of the npn transistor Q6 and a base of the pnp transistor Q6 are coupled to the second terminal of the resistor R10 and to the first terminal of the capacitor C5. A collector of the transistor Q6 is coupled to the supply node Vcc. An emitter of the transistor Q6 is coupled to an emitter of the transistor Q7 and to a first terminal of the resistor R11. A collector of the transistor Q7 is coupled to the ground node.

The transistors Q6 and Q7 form a push-pull transistor pair. This configuration allows the transistor Q7 to draw current away from the capacitor $C_T$, slowing the rate at which the capacitor $C_T$ is charged when the frequency of the SYNC2 signal is lower than the frequency of the VR signal, and also allows the transistor Q6 to supply current to the capacitor $C_T$, increasing the rate at which the capacitor $C_T$ is charged when the frequency of the SYNC2 signal is higher than the frequency of the VR signal. Therefore, the ramp waveform VRAMP3 can have a frequency that is lower than, or higher than, the free-running frequency of the oscillator 16 because the circuit illustrated in FIG. 12 can synchronize the oscillator 16 to a frequency that is either above or below the free running frequency of the oscillator 16.

It will be apparent that the collector of the transistor Q7 can be coupled to a supply node that is below the ground level, thus providing an even wider range of frequencies to which the oscillator 16 can be synchronized, so long as appropriate modifications are made to the remaining portions of the circuit. For example, the phase comparator 10 and low pass filter 12 would need to have an ability to provide a signal to the push-pull transistor pair Q6, Q7 that is below the ground level. Such an embodiment is less preferred, however, as the circuit complexity is increased. It will also be apparent that the voltage controlled current source 20 can be a buffer circuit or an operational amplifier circuit having an ability to sink and source current.

Figure 13:
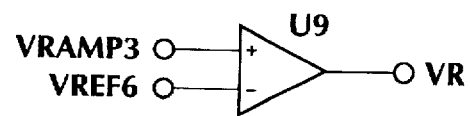
FIG. 13 illustrates an alternate embodiment of the waveform shaping circuit illustrated in FIGS. 7, 11 and 12.

FIG. 13 illustrates an alternate embodiment of the waveform shaping circuit 18 illustrated in FIGS. 7, 11 and 12. The ramp signal VRAMP3 is coupled to a non-inverting input of a comparator U9. A reference voltage VREF6 is coupled to an inverting input of the comparator U9. The level of the reference voltage VREF6 is selected to be below the expected peak level for the signal VRAMP3 (i.e. below the level of VREF5). Preferably, the reference voltage VREF6 is selected to be 50 mV below the expected peak level for the signal VRAMP3. The comparator U9 can have a hysteretic transfer characteristic, but it is not necessary. Therefore, the signal VR is formed at the output of the comparator U9. Alternately, a clock output of an oscillator, such as the signal VCLK illustrated in FIG. 8 (or in FIG. 14), can be coupled to the $B_{IN}$ input of the phase comparator 10.

Figure 14:
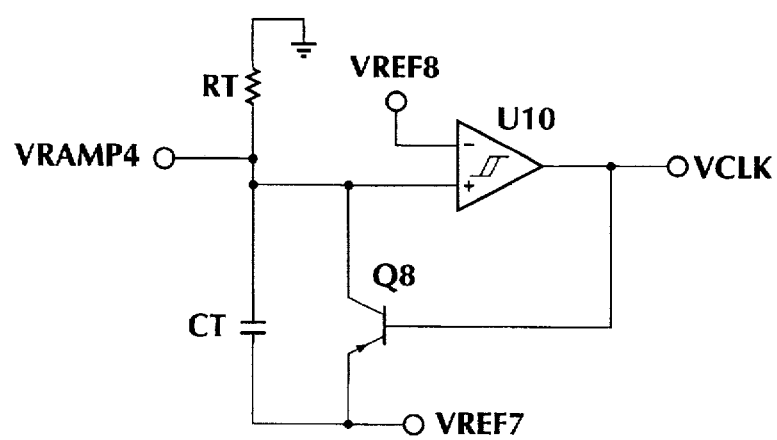
FIG. 14 illustrates a schematic diagram of an oscillator circuit for generating a periodic ramp signal VRAMP4 having a negative slope.

It will be apparent that the advantages of the present invention can be achieved utilizing oscillator circuits having a different configuration than the oscillator illustrated in FIG. 8. For example, the oscillator can form a periodic ramp signal having a negative slope over each period, in contrast to the ramp signal VRAMP3 which has a positive slope. This can be achieved by quickly charging the timing capacitor $C_T$ to a predetermined voltage and then more slowly discharging the capacitor $C_T$ through a timing resistor $R_T$. FIG. 14 illustrates a schematic diagram of an oscillator circuit for generating a periodic ramp signal VRAMP4 having a negative slope. A reference voltage VREF7 is coupled to a first terminal of a timing capacitor $C_T$ and to an emitter of an pnp bipolar transistor Q8. A second terminal of the capacitor $C_T$ is coupled to a collector of the transistor Q8, to a first terminal of a timing resistor $R_T$ and to a non-inverting input of a hysteretic comparator U10, forming a node VRAMP4. A second terminal of the resistor $R_T$ is coupled to the ground node. An output of the comparator U10 is coupled to a base of the transistor Q8, forming a node VCLK. An inverting input of the comparator U10 is coupled to a reference voltage VREF8.

Referring to FIG. 14, the reference voltage VREF8 is lower than the reference voltage VREF7. When the output of the comparator U10 is a logical low voltage, the transistor Q8 is turned on, bringing the voltage level at the node VRAMP4 to near the voltage level of VREF7. This causes the output of the comparator U10 to rise to a logical high voltage. Because the comparator U10 is hysteretic, its output does not rise until the charge on the capacitor $C_T$ has equalized. Then, the capacitor $C_T$ begins discharging through the resistor $R_T$, causing the voltage at the node VRAMP3 to fall such that it has a negative slope that is substantially linear. When the voltage at the node VRAMP4 falls below the reference voltage VREF8, the output of the comparator U10 falls to a logical low voltage, turning the transistor Q4 on again, and the cycle repeats.

To synchronize the ramp signal VRAMP4 with a periodic clock signal, the voltage controlled current source 14 can increase or reduce the rate at which the timing capacitor $C_T$ is discharged. This can be achieved by utilizing a transistor coupled across the resistor $R_T$ and coupled to be controlled by the phase comparator 10. It will be apparent that the timing resistor $R_T$ illustrated in FIGS. 8 and 14 can be replaced with a constant current source as this will improve the linearity of the ramp signals VRAMP3 and VRAMP4. Alternately, the resistor $R_T$ can be replaced with a voltage controlled current source coupled to be controlled by the phase comparator 10.

Figure 15A:
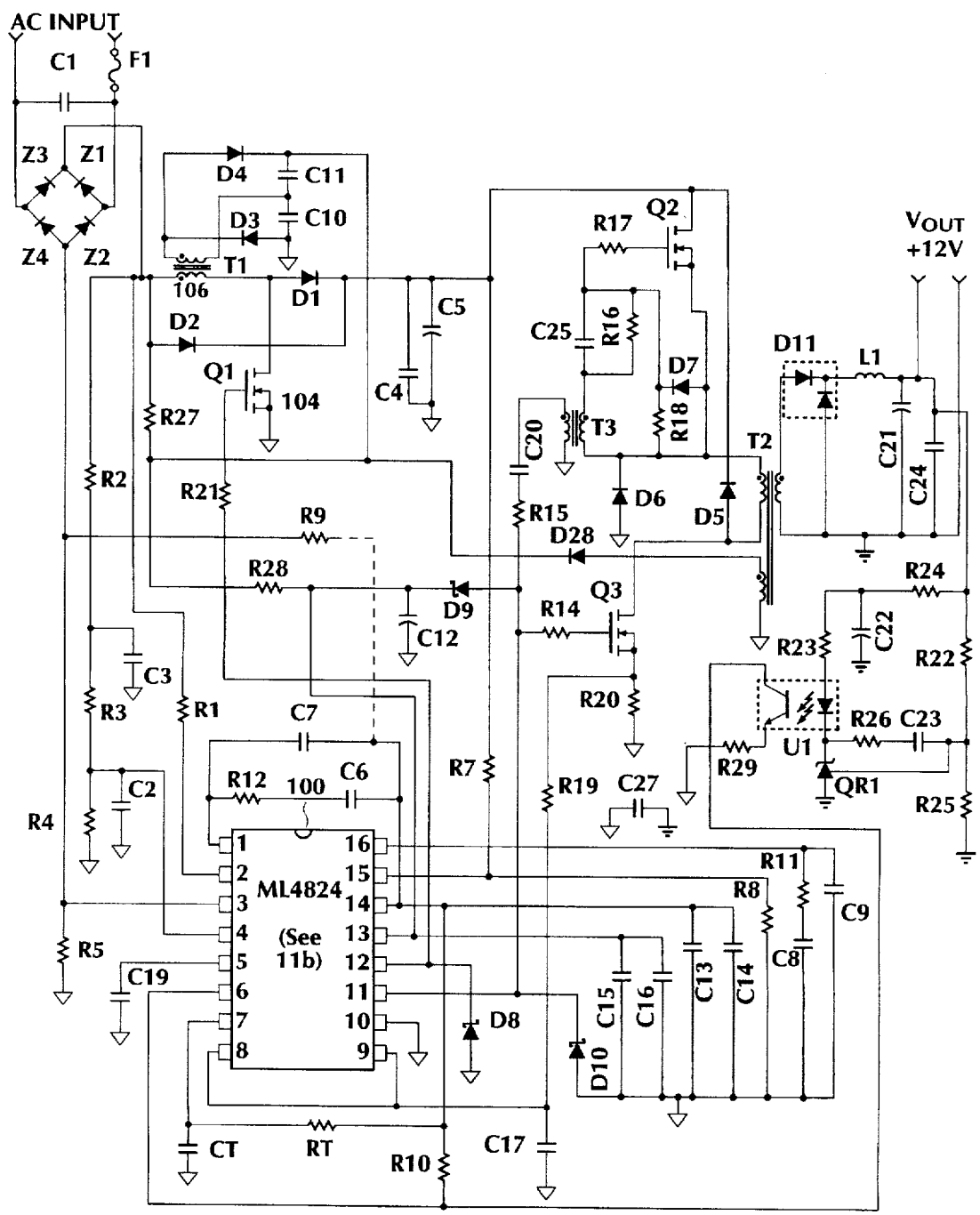
FIG. 15 illustrates a schematic diagram of an integrated circuit switching mode power converter controller including a ramp oscillator circuit that can be synchronized to a system clock signal.
Figure 15B:
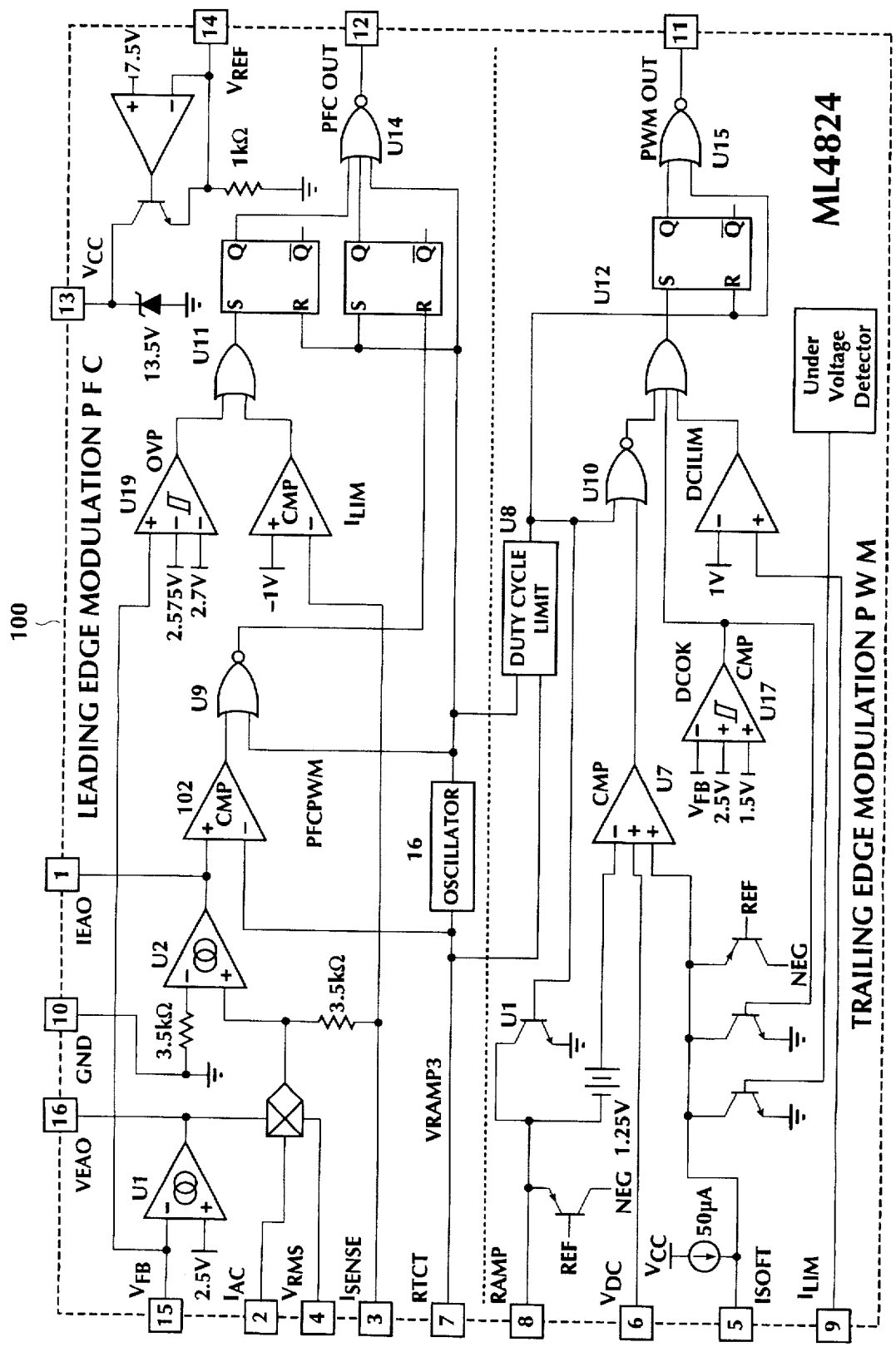

It will be apparent that the advantages of the present invention can be achieved by applying the principles disclosed herein to a variety of circuits which utilize a periodic ramp signal and which would benefit by the synchronization of the periodic ramp signal to another signal. For example, a switching mode buck converter or a switching mode boost converter can benefit from the present invention. As an example, FIG. 15 illustrates a schematic diagram of an integrated circuit switching mode power converter controller 100 including a ramp oscillator circuit 16 that can be synchronized to a system clock signal. Preferably, the integrated circuit controller 100 is an integrated circuit available under part number ML4824 from Micro Linear Corporation, located at 2092 Concourse Drive in San Jose, Calif., but could be any other switching mode power converter controller circuit. FIG. 15 illustrates the integrated circuit power converter controller 100 and external circuits for implementing a two stage power converter having a first, power factor correction stage and a second, pulse width modulation stage.

Referring to FIG. 15, the VRAMP3 signal is formed at a pin 7 of the integrated circuit controller 100. External to the integrated circuit controller 100, the timing capacitor $C_T$ and the timing resistor $R_T$ are coupled to pin 7. Internal to the integrated circuit controller 100, pin 7 is coupled to an oscillator circuit 16 corresponding to the oscillator circuit 16 illustrated in FIG. 11. The signal VRAMP3 is applied to logic circuits including a comparator 102 for controlling a duty cycle of a switch 104 for appropriately charging and discharging an inductor 106. By adding the voltage controlled current source 14 illustrated in FIGS. 7 and 11 to the circuit illustrated in FIG. 15, the oscillator 16 illustrated in FIG. 15 is transformed from a free-running oscillator to a voltage-controlled oscillator. By also adding the phase comparator 10, low pass filter 12, and waveform shaping circuit 18 illustrated in FIGS. 7 and 11, the frequency of the oscillator 16 illustrated in FIG. 15 is locked to a system clock signal. Preferably, the oscillator 16 can lock to a system clock signal having a frequency in the range of 25 kHz to 75 kHz.

Figure 16:
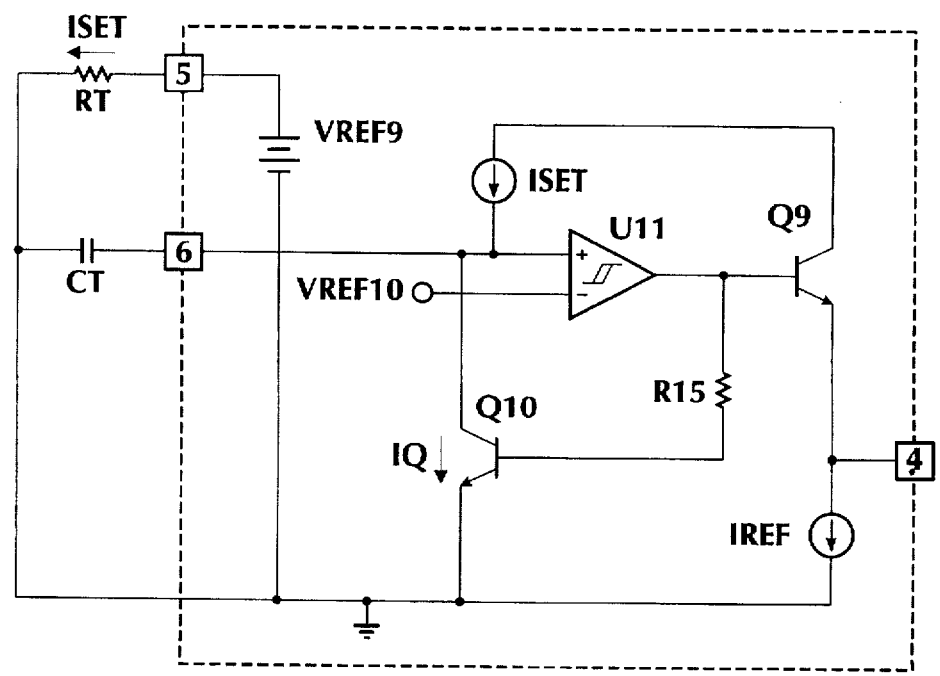
FIG. 16 illustrates a schematic diagram of an oscillator circuit having separate $C_T$ and $R_T$ terminals.

As another example, other circuits that utilize a periodic ramp waveform can have separate terminals for each of the timing resistor $R_T$ and timing capacitor $C_T$. In such circuits, the frequency of the ramp signal can be controlled according to the present invention by applying the output of the voltage controlled current source 14 (FIG. 11) or the output of the voltage controlled current source 20 (FIG. 12) to the $C_T$ terminal. FIG. 16 illustrates a schematic diagram of an oscillator circuit having separate $C_T$ and $R_T$ terminals. The oscillator illustrated in FIG. 16 is a portion of an integrated circuit power converter controller available under part number ML4823 from Micro Linear Corporation.

In another embodiment, the frequency of the ramp signal can be controlled according to the present invention by coupling the output of the low pass filter 12 to a control terminal of a transistor, such as a field effect or bipolar transistor, which replaces the timing resistor $R_T$. Therefore, the fixed impedance of the timing resistor $R_T$ is replaced with the variable impedance of the transistor.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth.

What is claimed is:

1. An apparatus for synchronizing a periodic ramp signal with a periodic clock signal comprising:
   a. a voltage controlled oscillator for forming the periodic ramp signal; and
   b. a waveform shaping circuit for forming a periodic rectangular signal having a same frequency as the periodic ramp signal; and
   c. a phase comparator for comparing a phase of the periodic rectangular signal to a phase of the periodic clock signal and for controlling the voltage controlled oscillator.

2. The apparatus according to claim 1 wherein a rising edge of the rectangular signal coincides with a falling edge of the periodic ramp signal.

3. The apparatus according to claim 1 wherein a falling edge of the periodic ramp signal is locked to a rising edge of the periodic clock signal.

4. The apparatus according to claim 1 further comprising a power converter wherein the periodic ramp signal is compared to an error signal representative of a difference between a regulated output and a desired output for controlling a duty cycle of a power switch.

5. The apparatus according to claim 1 wherein the waveform shaping circuit comprises:
   a. a first transistor having a base, a collector and an emitter wherein the base of the first transistor is coupled to receive the periodic ramp signal and the collector of the first transistor is coupled to a supply node;
   b. a first resistor having a first terminal and a second terminal wherein the first terminal of the first resistor is coupled to the emitter of the first transistor and the second terminal of the first resistor is coupled to a ground node;
   c. a first capacitor having a first terminal and a second terminal wherein the first terminal of the first capacitor is coupled to the emitter of the first transistor;
   d. a diode having an anode and a cathode wherein an anode of the diode is coupled to the second terminal of the first capacitor and the cathode is coupled to the supply node;
   e. a second transistor having a base, a collector and an emitter wherein a base of the second transistor is coupled to the anode of the diode;

f. a second resistor having a first terminal and a second terminal wherein the first terminal of the second resistor is coupled to the collector of the second transistor and the second terminal of the second resistor is coupled to the supply node;

g. a second capacitor having a first terminal and a second terminal wherein the first terminal of the second capacitor is coupled to the collector of the second transistor and the second terminal of the second capacitor is coupled to the supply node; and h. a third resistor having a first terminal and a second terminal wherein the first terminal of the third resistor is coupled to the emitter of the second transistor and the second terminal of the third resistor is coupled to the ground node wherein the rectangular signal is formed at the first terminal of the third resistor.

6. The apparatus according to claim 1 wherein the voltage controlled oscillator comprises:

a. a timing capacitor coupled to receive a first current from a supply node; and b. a voltage controlled current source coupled to supply a second current to the timing capacitor; and c. a circuit for discharging the capacitor when a voltage across the capacitor reaches a predetermined level.

7. The apparatus according to claim 6 wherein the voltage controlled current source comprises a transistor.

8. An apparatus for synchronizing a periodic ramp signal with a periodic clock signal comprising:

a. a phase comparator having a first input, a second input and an output, wherein the first input is coupled to receive the periodic clock signal and the second input is coupled to receive a signal representative of the periodic ramp signal;

b. a current source coupled to be controlled by the output of the phase comparator; and c. a timing capacitor coupled to be charged by a current supplied by the current source wherein the periodic ramp signal is formed across the capacitor and a frequency of the ramp signal is dependent upon a level of current supplied by the voltage controlled current source.

9. The apparatus according to claim 8 wherein a falling edge of the periodic ramp signal is locked to a rising edge of the periodic clock signal.

10. The apparatus according to claim 8 wherein the capacitor is discharged when a voltage across the capacitor reaches a predetermined level.

11. The apparatus according to claim 8 wherein the current source draws current from the timing capacitor when the output of the phase comparator is in a first condition and supplies current to the timing capacitor when the output of the phase comparator is in a second condition.

12. The apparatus according to claim 11 wherein the first condition occurs when a frequency of the periodic clock signal is lower than the frequency of the ramp signal and wherein the second condition occurs when the frequency of the periodic clock signal is higher than the frequency of the ramp signal.

13. The apparatus according to claim 11 wherein the current source is a push-pull transistor pair.

14. The apparatus according to claim 8 wherein the current source is a transistor.

15. The apparatus according to claim 8 further comprising a low pass filter coupled between the phase comparator and the current source.

16. The apparatus according to claim 8 wherein the timing capacitor is also charged through a resistor by a supply voltage.

17. The apparatus according to claim 8 wherein the signal representative of the periodic ramp signal is a periodic rectangular signal wherein a falling edge of the rectangular signal coincides with a rising edge of the rectangular signal.

18. The apparatus according to claim 8 further comprising a power converter wherein the periodic ramp signal is compared to an error signal representative of a difference between a regulated output and a desired output for controlling a duty cycle of a power switch.

19. A method of synchronizing a periodic ramp signal with a periodic clock signal comprising the step of:

a. forming a current signal wherein a level of the current signal is representative of a difference in phase between the periodic ramp signal and the periodic clock signal; and b. charging a charge storage device with the current signal and periodically discharging the charge storage device thereby forming the periodic ramp signal across the charge storage device.

20. The method according to claim 19 further comprising the step of discharging the charge storage device each time a voltage across the charge storage device reaches a predetermined level.

21. The method according to claim 20 further comprising steps of:

a. comparing the periodic ramp signal is to an error signal representative of a difference between a regulated output and a desired output;

b. controlling a duty cycle of a power switch based upon a result of the step of comparing.

22. The method according to claim 21 further comprising a step of forming a signal representative of the periodic ramp signal wherein a falling edge of the signal representative of the periodic ramp signal coincides with a rising edge of the rectangular signal.

23. The method according to claim 21 wherein a falling edge of the periodic ramp signal is coincides with a rising edge of the periodic clock signal.

24. The method according to claim 21 wherein the current signal is formed by a transistor coupled to the charge storage device.

25. The method according to claim 24 wherein the current signal is also formed by a resistor coupled to the charge storage device.

* * * * *